(12) United States Patent
Ida

(10) Patent No.: US 12,015,749 B1
(45) Date of Patent: Jun. 18, 2024

(54) IMAGE PROCESSING DEVICE AND APPLICATION OPERATION CONTROL METHOD

(71) Applicant: Toshiba Tec Kabushiki Kaisha, Tokyo (JP)

(72) Inventor: Toshihiro Ida, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/190,916

(22) Filed: Mar. 27, 2023

(51) Int. Cl.
*H04N 1/00* (2006.01)
*G06F 9/48* (2006.01)
*H04N 1/44* (2006.01)

(52) U.S. Cl.
CPC ......... *H04N 1/00954* (2013.01); *G06F 9/485* (2013.01); *G06F 9/4881* (2013.01); *H04N 1/4433* (2013.01)

(58) Field of Classification Search
CPC .. H04N 1/00954; H04N 1/4433; G06F 9/485; G06F 9/4881
See application file for complete search history.

(56) References Cited

U.S. PATENT DOCUMENTS

| | | | |
|---|---|---|---|
| 9,100,594 B2 * | 8/2015 | Morino | H04N 1/32454 |
| 10,631,165 B1 * | 4/2020 | Goyal | H04W 4/023 |
| 2016/0291795 A1 * | 10/2016 | Chen | G06F 3/0488 |
| 2020/0099810 A1 * | 3/2020 | Inomata | H04N 1/00503 |
| 2021/0240505 A1 * | 8/2021 | Wang | G06F 3/122 |
| 2023/0098312 A1 * | 3/2023 | Mangaldeep | G06F 9/5016 718/104 |

FOREIGN PATENT DOCUMENTS

| | | |
|---|---|---|
| JP | 2006-202028 A | 8/2006 |
| JP | 2008-166930 A | 7/2008 |
| JP | 2015-097034 A | 5/2015 |

\* cited by examiner

*Primary Examiner* — Helen Zong
(74) *Attorney, Agent, or Firm* — FOLEY & LARDNER LLP

(57) ABSTRACT

An image processing apparatus includes a memory, a user interface, and a processor. The memory stores a plurality of user applications and a plurality of background applications related to image processing. The user interface receives a user input. The processor controls an image processing unit (e.g., a printer, a scanner, etc.) to execute image processing functions (e.g., printing, scanning, copying, etc.). The processor controls activation and deactivation of the plurality of user applications and the plurality of background applications. The processor activates a subset of the plurality of background applications in a number equal to or less than an activation limit number and based on execution history of the plurality of background applications.

14 Claims, 6 Drawing Sheets

FIG. 2

SCHEMATIC CONFIGURATION OF APPLICATION

| FUNCTION A | USER APPLICATION A | BACKGROUND APPLICATION A |
| --- | --- | --- |
| FUNCTION B | USER APPLICATION B | BACKGROUND APPLICATION B |
| FUNCTION C | USER APPLICATION C | BACKGROUND APPLICATION C |
| FUNCTION D | USER APPLICATION D | BACKGROUND APPLICATION D |
| FUNCTION E | USER APPLICATION E | BACKGROUND APPLICATION E |
| FUNCTION F | USER APPLICATION F | BACKGROUND APPLICATION F |
| FUNCTION G | USER APPLICATION G | BACKGROUND APPLICATION G |

FIG. 3

BACKGROUND APPLICATION MANAGEMENT INFORMATION

| BACKGROUND APPLICATION IDENTIFICATION INFORMATION | STATUS | EXECUTION HISTORY OF USER A | EXECUTION HISTORY OF USER B |
| --- | --- | --- | --- |
| BACKGROUND APPLICATION A | ACTIVATED | 10 | 1 |
| BACKGROUND APPLICATION B | ACTIVATED | 3 | 2 |
| BACKGROUND APPLICATION C | STOPPED | 0 | 3 |
| BACKGROUND APPLICATION D | ACTIVATED | 0 | 100 |
| BACKGROUND APPLICATION E | ACTIVATED | 100 | 5 |
| BACKGROUND APPLICATION F | STOPPED | 5 | 6 |
| BACKGROUND APPLICATION G | ACTIVATED | 5 | 7 |

IMAGE PROCESSING DEVICE AND APPLICATION OPERATION CONTROL METHOD

FIELD

Embodiments described herein relate generally to an image processing apparatus and an application operation control method.

BACKGROUND

An image forming apparatus using an electrophotographic process is widely used. In recent years, image forming apparatuses have become more multi-functional and store many application programs for performing such functions. These image forming apparatuses may be in a state where the application program is activated, that is, the application program may be stationed. The image forming apparatuses realize smooth image processing with little stress by making a predetermined application program be stationed.

DESCRIPTION OF THE DRAWINGS

FIG. 2 is a schematic diagram illustrating an example of an application configuration;

FIG. 3 is a diagram illustrating an example of background application management information stored in a data memory;

DETAILED DESCRIPTION

In general, according to one embodiment, an image processing apparatus includes a memory, a user interface, a processor, and an image processing unit. The memory stores a plurality of user applications and a plurality of background applications related to image processing. The user interface receives input. The processor controls activation and stop/deactivation of the plurality of user applications and the plurality of background applications. The image processing unit executes image processing. The processor activates background applications in the number equal to or less than an activation limit number based on execution history of the plurality of background applications.

An image processing apparatus according to an embodiment is described below with reference to the drawings. In each drawing used for describing the embodiments below, the scale of each part is appropriately changed. In each drawing used for describing the embodiments below, the configuration is appropriately omitted for the sake of description.

[Configuration]

Figure 1:
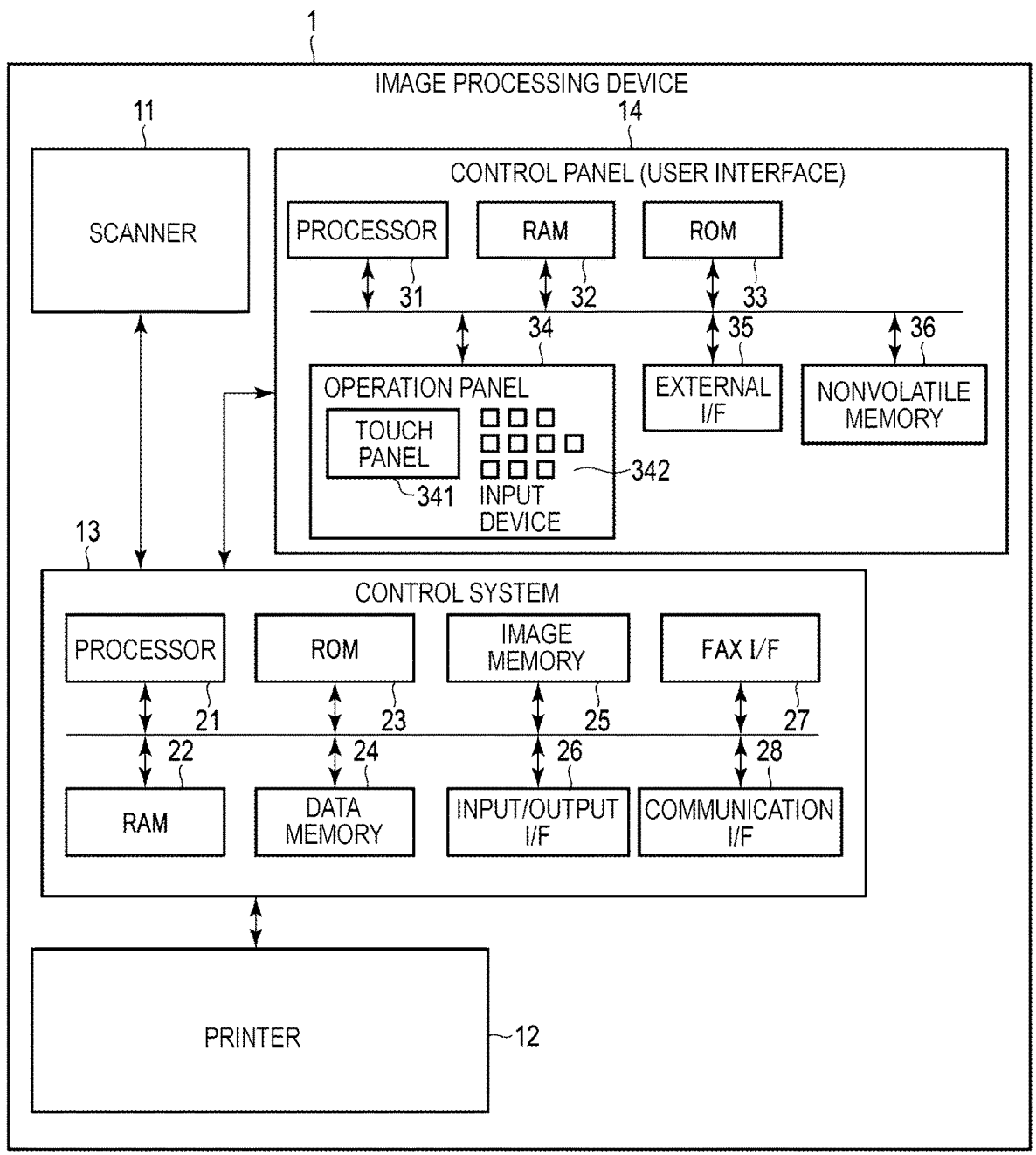
FIG. 1 is a block diagram illustrating an example of an image processing apparatus according to an embodiment.

FIG. 1 is a block diagram illustrating an example of an image processing apparatus according to an embodiment. For example, an image processing apparatus 1 is a multi-functional peripheral (MFP) and includes a plurality of functions. The image processing apparatus 1 includes a memory that stores a program, and the memory stores a plurality of application programs (hereinafter, referred to as applications) corresponding to the plurality of functions. The applications stored in the image processing apparatus 1 are specifically described below.

As illustrated in FIG. 1, the image processing apparatus 1 includes a scanner 11, a printer 12, a control system 13, and a control panel 14. The control system 13 is connected to the scanner 11, the printer 12, and the control panel 14.

The scanner 11 is one of the image processing units and executes a read operation in response to an operation instruction from the control system 13. The scanner 11 optically reads an image of a document and outputs read image data corresponding to the image of the document.

The printer 12 is one of the image processing units and forms an image on a sheet based on various printing conditions designated from the control system 13. For example, the printer 12 forms an image on a sheet based on the read image data output from the scanner 11. Otherwise, the printer 12 forms an image on a sheet based on received image data transmitted from an external device.

The control system 13 comprehensively controls the entire image processing apparatus 1. For example, the control system 13 inputs an input signal from each unit such as the scanner 11, the printer 12, and the control panel 14 and output a control signal to each unit.

The control system 13 includes a processor 21, a random-access memory (RAM) 22, a read-only memory (ROM) 23, a data memory 24, an image memory 25, an input/output interface (UF) 26, a FAX interface (UF) 27, a communication interface (UF) 28, and the like.

The processor 21 is a central processing unit (CPU) or the like and realizes various functions by executing a program stored in the ROM 23 or the data memory 24. The RAM 22 is a working memory. The RAM 22 reads a program to be executed and functions as a buffer memory. The ROM 23 is a program memory. The ROM 23 stores programs and setting data and the like unique to the image processing apparatus 1. The data memory 24 stores programs, setting information, and the like. The data memory 24 is a rewritable non-volatile memory. The image memory 25 stores image data. The input/output interface 26 inputs read image data output from the scanner 11, outputs the read image data to the printer 12 and outputs the received image data received from the communication interface 28 to the printer 12.

The FAX interface 27 transmits and receives an image via a telephone line. The communication interface 28 transmits and receives data to and from an external device via a network.

The control panel 14 is a part of a user interface, outputs various kinds of information to a user, and receives a request (instruction) from the user. The control panel 14 includes a processor 31, a RAM 32, a ROM 33, an operation panel 34, an external interface (UF) 35, and a non-volatile memory 36.

The processor 31 is a CPU or the like and realizes various functions by executing programs stored in the ROM 33. The processor 31 controls each unit of the control panel 14 in response to a control signal from the control system 13. The RAM 32 is a working memory. The ROM 33 is a program memory.

The operation panel 34 includes a touch panel 341 and an input device 342. The touch panel 341 is configured by stacking, for example, a liquid crystal display or an organic electro-luminescence (EL) display and a sensing device for detecting touch input. A display included in the touch panel 341 displays various kinds of information to a user. The touch panel 341 receives a touch operation and a tracing operation by a user. A touch operation is an operation of touching various kinds of displayed text information or image information with a finger, a touch pen, or the like. A tracing operation is an operation of tracing an area corresponding to various kinds of displayed text information or image information with a finger or a pointing device. The touch panel 341 outputs information indicating a position touched by the user and the traced area to the processor 31 as a detection signal. The input device 342 receives operations by the user. The input device 342 is, for example, a button, a keyboard, a keypad, or a touchpad.

The processor 31 controls information displayed on the touch panel 341. The processor 31 displays various kinds of information on the touch panel 341 in response to the instruction from the control system 13. The processor 31 also specifies the position touched by the user and the traced area based on the detection signal from the touch panel 341. The processor 31 outputs information indicating the content of the detected instruction to the processor 21 of the control system 13. The processor 31 may detect the content of the operation instruction in response to a touch operation and a tracing operation by the user detected by the touch panel 341.

The external interface 35 is an interface for communicating with external devices. The external interface 35 is an interface conforming to general-purpose standards such as a universal serial bus (USB). The non-volatile memory 36 stores information or the like input from the touch panel 341.

[Application]

FIG. 2 is a schematic diagram illustrating an example of an application configuration according to the embodiment. The image processing apparatus 1 receives addition and deletion of an application and stores a plurality of applications corresponding to a plurality of functions. For example, the data memory 24 stores a plurality of applications. When adding an application, the control system 13 receives an application provided from an external service via the communication interface 28 and stores the received application in the data memory 24. When deleting an application, the control system 13 deletes a predetermined application from the data memory 24 based on a deletion instruction of a predetermined application received via the control panel 14.

The data memory 24 stores a plurality of user applications and a plurality of background applications related to image processing. For example, the user application is a module related to a user interface for receiving user input, and the background application is a module related to background processing independent from the user input.

The processor 21 controls activation and stop/deactivation of a user application and controls activation and stop/deactivation of a background application under the condition of an activation limit number. For example, the processor 21 may be in a state in which a background application is activated, that is, a background application is stationed. The image processing apparatus 1 realizes smooth image processing with little stress by stationing a background application under the condition of an activation limit number.

A predetermined user application and a predetermined background application share a predetermined function (image processing). The processor 21 respectively activates a predetermined user application (module) and a predetermined background application (module) that cooperate with each other or activates a predetermined user application corresponding to a stationed (activated) predetermined background application, and executes a predetermined function.

As illustrated in FIG. 2, the processor 21 activates a user application A and a background application A and executes a function A. The same is applied to functions B, C, D, E, F, and G.

For example, a predetermined user application is an application that receives a user input, and receives the user input. The processor 21 activates a predetermined user application corresponding to the input detected by the touch panel 341, and the control panel 14 displays a menu screen on the touch panel 341 based on the predetermined user application. The control panel 14 receives the user input such as an image read condition and an image read start via the menu screen based on the predetermined user application.

The scanner 11 that is one of the image processing unit reads a document image based on the user input received via the menu screen and outputs read image data corresponding to the document image.

The background application is an application corresponding to background processing. For example, the predetermined background application transmits read image data output from the scanner 11 to a designated storage destination. The designated storage destination may be the data memory 24 of the image processing apparatus 1 and may be an external server or the like.

The data memory 24 stores an activation limit number of the background application as a set value. The processor 21 can station background applications under the activation limit number. For example, even if the data memory 24 stores ten background applications, if the activation limit number is five, the processor 21 can activate five background applications at most and can activate no more background applications.

[Execution History]

The image processing apparatus 1 manages background application management information. For example, the data memory 24 stores background application management information. The processor 21 updates background application management information corresponding to the activation of a background application.

Otherwise, an external server or the like collects background application management information transmitted from each item of the image processing apparatus 1, and the image processing apparatus 1 may obtain background application management information from an external service or the like via the communication interface 28. The external service or the like receives activation information of the background application transmitted from the plurality of items of the image processing apparatus 1 and updates the background application management information based on the received activation information.

The background application management information includes background application identification information, a status, and execution history. The execution history is information showing a usage frequency of a background application and includes the number of times of activation, date and time of activation, and duration of activation. For example, the processor 21 comprehensively determines a degree of a usage frequency based on the number of times of activation, date and time of activation, and duration of activation and may determine a degree of the usage frequency based on any one of the number of times of activation, date and time of activation, and duration of activation.

The image processing apparatus 1 manages login and logout and provides various services in a login state or a logout state. For example, the data memory 24 stores user management information. The external interface 35 reads a predetermined user identification information from an ID card, and the processor 21 receives predetermined login of a user based on a match of the read predetermined user identification information and the predetermined user identification information registered into the user management information and transitions to a predetermined user login state. If there is no operation input for a predetermined period of time, the processor 21 transitions to a logout state.

The processor 21 manages execution history in correlation with predetermined user identification information corresponding to the activation of the background application in the predetermined user login state. The background application management information stored in the data memory 24 includes execution history in correlation with the background application identification information, the status, and the predetermined user identification information. If the external server or the like stores background application management information, the external server or the like receives activation information of the background application transmitted from each item of the image processing apparatus 1 and updates the background application management information based on the received activation information.

FIG. 3 is a diagram illustrating an example of background application management information stored in a data memory according to the embodiment. As illustrated in FIG. 3, the background application management information includes the background application identification information, the status (activated or stopped), and the execution history. The execution history includes execution history (usage frequency) of the user A, and execution history (usage frequency) of a user B.

[Entrance/Exit Management Information/Attendance Management Information]

Figure 4:
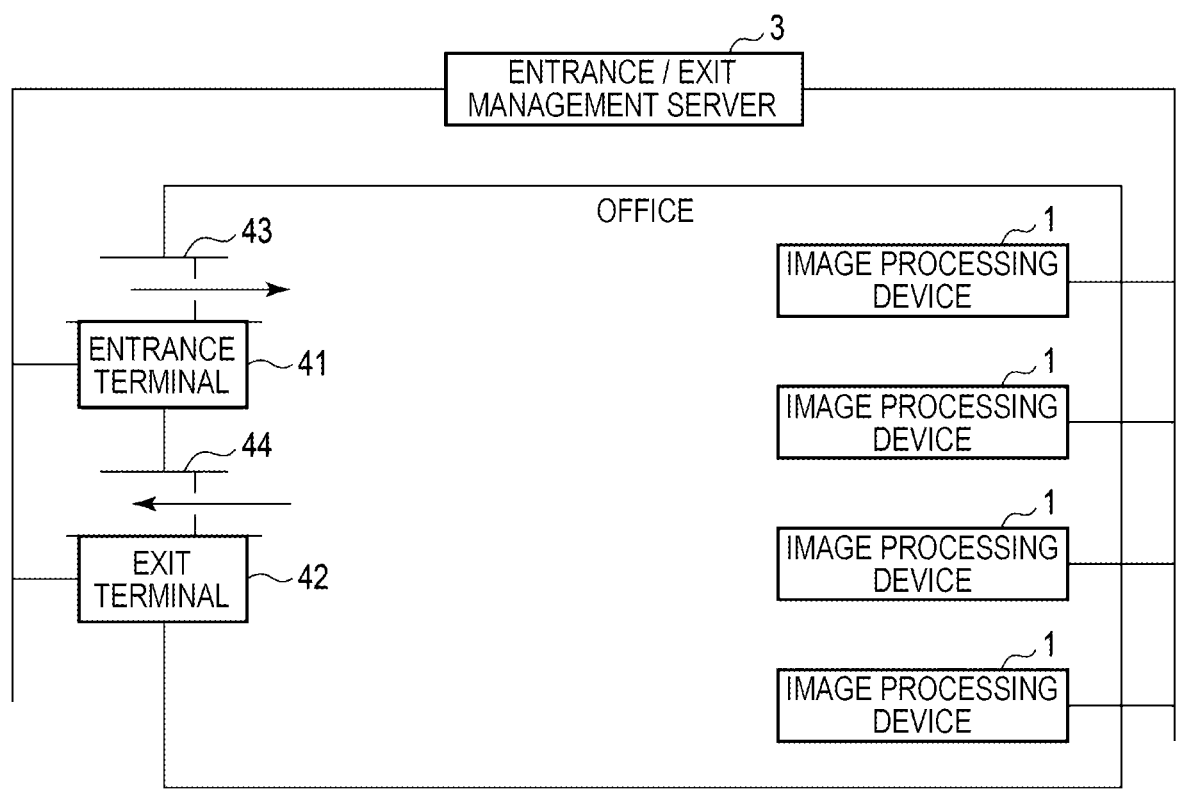
FIG. 4 is a diagram illustrating an example of the image processing apparatus applied to an entrance/exit management system.

FIG. 4 is a diagram illustrating an example of the image processing apparatus applied to an entrance/exit management system according to the embodiment.

As illustrated in FIG. 4, the entrance/exit management system includes an entrance terminal 41, an exit terminal 42, and an entrance/exit management server 3. The entrance terminal 41 is installed in correspondence with an entrance gate 43 of an office (or a building, a floor of the building, a room of the building, etc.), and the exit terminal 42 is installed in correspondence with an exit gate 44 of the office. The entrance terminal 41 reads predetermined user identification information from an ID card or the like and transmits the predetermined user identification information to the entrance/exit management server 3. The exit terminal 42 reads the predetermined user identification information from an ID card or the like and transmits the predetermined user identification information to the entrance/exit management server 3.

The entrance/exit management server 3 stores user management information. The entrance/exit management server 3 receives the predetermined user identification information read from the entrance terminal 41 and registers entrance history in correlation with the predetermined user identification information into the entrance/exit management information based on a match of the read predetermined user identification information and the predetermined user identification information registered into the user management information. For example, the entrance history includes user identification information and date and time of the entrance. The entrance/exit management server 3 transmits an entrance permission of a predetermined user to the entrance terminal 41. The entrance terminal 41 opens the entrance gate 43 and enables the entrance into the office.

The entrance/exit management server 3 receives the read predetermined user identification information from the exit terminal 42 and registers the exit history in correlation with the predetermined user identification information into the entrance/exit management information based on a match of the read predetermined user identification information and the predetermined user identification information registered into the user management information. For example, the exit history includes user identification information and date and time of the exit. The entrance/exit management server 3 transmits an exit permission of the predetermined user to the exit terminal 42. The exit terminal 42 opens the exit gate 44 and enables the exit from the office.

The image processing apparatus 1 is connected to the entrance/exit management server 3 via the communication interface 28, and the processor 21 obtains the entrance/exit management information in correlation with the user identification information from the entrance/exit management server 3. The processor 21 controls the activation or stop/deactivation of the background application based on the entrance/exit management information in correlation with the user identification information.

Instead of the entrance terminal 41 and the exit terminal 42, a terminal such as a personal computer in an office may receive attending information or leaving information in correlation with the user identification information and transmit attending information or leaving information to the entrance/exit management server 3. The entrance/exit management server 3 registers the attending information in correlation with the user identification information to the attendance management information. For example, the attending information includes user identification information and date and time of the attendance. The entrance/exit management server 3 registers the leaving information in correlation with the user identification information to the attendance management information. For example, the leaving information includes user identification information and date and time of the leaving.

The image processing apparatus 1 is connected to the entrance/exit management server 3 via the communication interface 28, and the processor 21 obtains the attendance management information in correlation with the user identification information from the entrance/exit management server 3. The processor 21 controls the activation or stop/deactivation of the background application based on the attendance management information in correlation with the user identification information.

[Background Application Operation Control]

Hereinafter, application operation control is described with reference to flowcharts illustrated in FIGS. 5 to 8. The execution subject of the application operation control or the method thereof is the control system 13 (processor 21).

Figure 5:
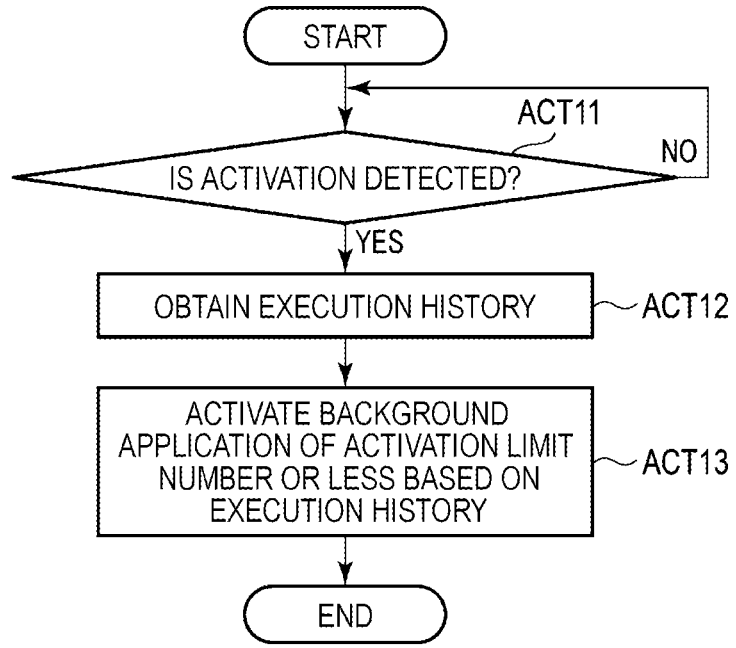
FIG. 5 is a flowchart illustrating a first example of background application operation control.

FIG. 5 is a flowchart illustrating a first example of background application operation control according to the embodiment. Here, the background application operation control based on the execution history is described.

When detecting the activation (ACT 11, YES), the processor 21 of the image processing apparatus 1 obtains the background application management information (execution history) from the data memory 24 or the external server (ACT 12). The detection of the activation detects a switch from a state in which power is not supplied to a state in which operating power is supplied (active state) and detects a switch from a state in which standby power lower than operating power is supplied (sleep state) to a state in which operating power is supplied (active state).

The processor 21 controls activation and stop/deactivation of the background application based on the execution history included in the background application management information. For example, the processor 21 activates background applications with a high usage frequency in the number equal to or less than the activation limit number of the background applications based on the execution history (ACT 13).

If the activation limit number is a predetermined number (for example, five), the processor 21 activates a predetermined number (for example, five) of background applications with higher usage frequency and stations the predetermined number of background applications.

Before the predetermined number of background applications with higher usage frequency are activated, if one or more background applications with lower usage frequency out of the predetermined number with higher usage frequency are activated, the activation of background applications with lower usage frequency interferes with the activation of the predetermined number of background applications with higher usage frequency. Therefore, after stopping one or more activated background applications, the processor 21 activates the predetermined number of background applications with higher usage frequency in the number equal to or less than the activation limit number.

For example, a state in which a predetermined number of background applications with higher usage frequency are activated is assumed. It is assumed that the first background application among the predetermined number of background applications with higher usage frequency has the lowest usage frequency.

If the control panel 14 receives a request of activation of the second background application, the processor 21 stops/deactivates the first background application with the lowest usage frequency and activates the requested second background application.

Otherwise, if the activated number exceeds the activation limit number due to the activation of the second background application, the control panel 14 activates the second background application after stopping/deactivating the first background application.

As a result, the image processing apparatus 1 realizes smooth image processing with little stress by stationing a background application with a relatively higher usage frequency.

Figure 6:
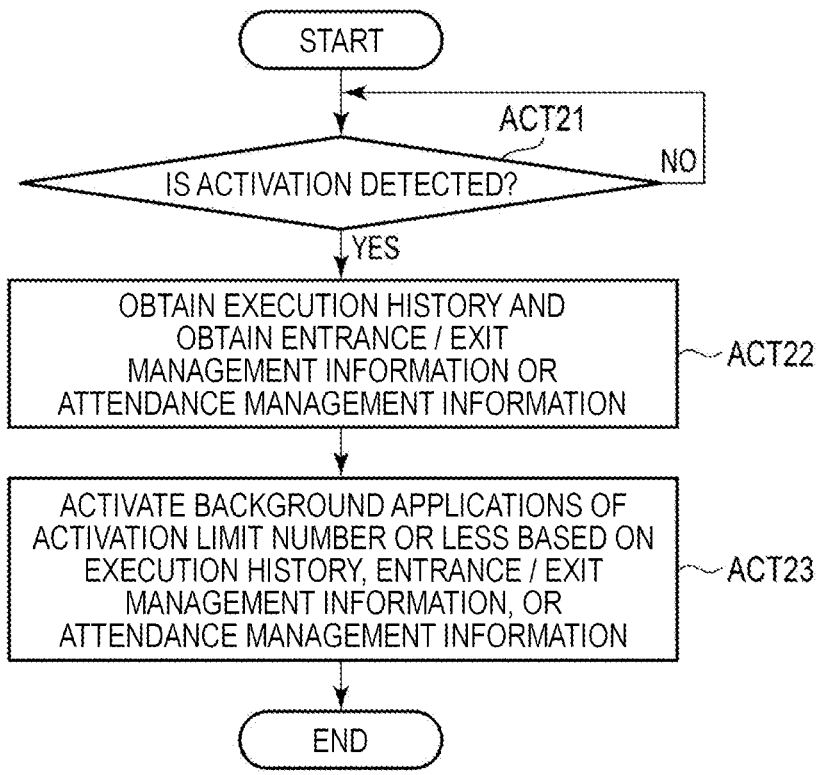
FIG. 6 is a flowchart illustrating a second example of the background application operation control.

FIG. 6 is a flowchart illustrating a second example of the background application operation control according to the embodiment. Here, background application operation control based on the execution history and the entrance/exit management information or the attendance management information is described.

When detecting activation (ACT 21, YES), the processor 21 of the image processing apparatus 1 obtains the background application management information (execution history) from the data memory 24 or the external server and obtains the entrance/exit management information or the attendance management information in correlation with the user identification information from the entrance/exit management server 3 (ACT 22). The detection of activation is as described in the first example.

The background application management information includes execution history in correlation with the user identification information. The entrance/exit management information includes entrance/exit history in correlation with the user identification information. The attendance management information includes attendance information in correlation with user identification information.

The processor 21 controls activation and stop/deactivation of the background application based on execution history in correlation with the user identification information and the entrance/exit history or attendance information in correlation with the user identification information. For example, the processor 21 activates background applications with higher usage frequency of a user who is entering or attending the office in the number equal to or less than the activation limit number of the background applications.

If the activation limit number is the predetermined number (for example, five), the processor 21 extracts execution history in correlation with user identification information of the user who is entering or attending the office, activates the predetermined number (for example, five) of background applications with higher usage frequency based on the extracted execution history, and stations the predetermined number of background applications.

Before activating the predetermined number of background applications having higher usage frequency, if one or more background applications with lower usage frequency out of the predetermined number with the higher usage frequency are activated, the background applications with lower usage frequency interferes the activation of the predetermined number of background applications with higher usage frequency. Therefore, after one or more activated background applications stop, the processor 21 activates a predetermined number of background applications with higher usage frequency in the number equal to or less than the activation limit number.

For example, a state in which a predetermined number of background applications with higher usage frequency are activated is assumed. It is assumed that the first background application among the predetermined number of background applications with higher usage frequency has the lowest usage frequency.

If the control panel 14 receives the request of activation of the second background application, the processor 21 stops/deactivates the first background application with the lowest usage frequency and activates the requested second background application.

Otherwise, if the activation number exceeds the activation limit number due to the activation of the second background application, the control panel 14 activates the second background application after stopping/deactivating the first background application.

As a result, the image processing apparatus 1 realizes smooth image processing with little stress by stationing the background application with higher usage frequency for a user who is entering or attending the office.

Figure 7:
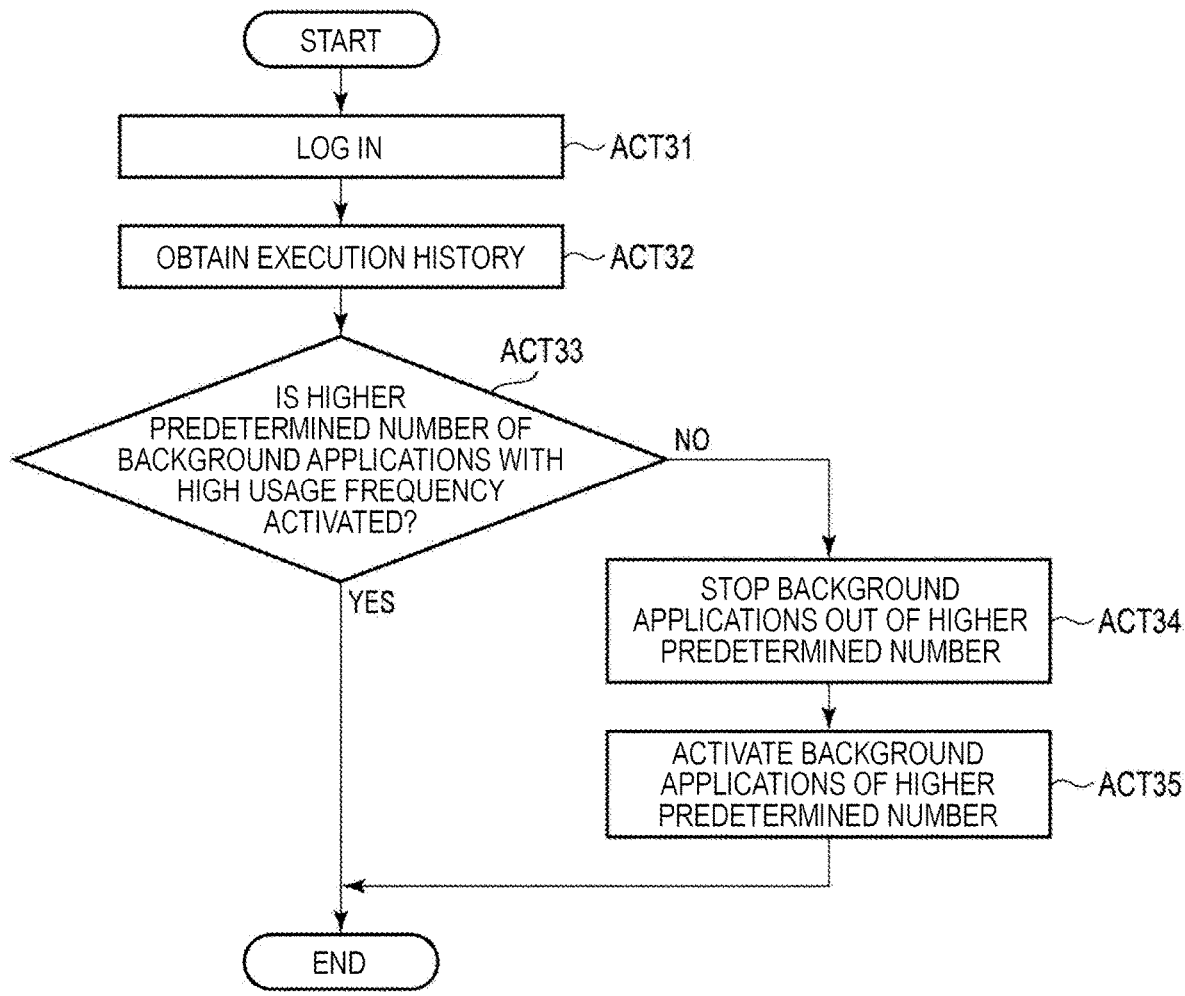
FIG. 7 is a flowchart illustrating a third example of the background application operation control.

FIG. 7 is a flowchart illustrating a third example of background application operation control according to the embodiment. Here, a case is described where the image processing apparatus 1 is used by a login user.

If an ID card or the like is put over the control panel 14 of the activated image processing apparatus 1, the external interface 35 reads the predetermined user identification information from the ID card or the like and transmits predetermined user identification information. The processor 21 receives login of a predetermined user (for example, a user A) based on a match of the read predetermined user identification information and the predetermined user identification information registered into the user management information and transitions into a state in which the user A logs in (ACT 31).

The processor 21 obtains the background application management information (execution history) from the data memory 24 or the external server (ACT 32).

The processor 21 controls the activation and stop/deactivation of the background application based on the execution history in correlation with the user identification information of the user A (ACTS 33 and 36).

For example, the processor 21 activates background applications with higher usage frequency in the number equal to or less than the activation limit number. If the activation limit number is the predetermined number (for example, five), processing ends if the predetermined number (for example, five) of background applications with higher usage frequency are activated (ACT 33, YES).

If the predetermined number of background applications with higher usage frequency are not activated (ACT 33, NO), one or more background applications with lower usage frequency out of the predetermined number with the higher usage frequency are stopped/deactivated (ACT 34), the predetermined number of background applications with higher usage frequency are activated in the number equal to or less than the activation limit number (ACT 35), and the activated background applications are stationed.

As a result, the image processing apparatus 1 realizes smooth image processing with little stress by stationing background applications with higher usage frequency for a login user.

If there is no operation input for a predetermined period of time, the processor 21 transitions from a state of being logged in by the user A to a state of being logged out.

After the transition to a logout state, the processor 21 executes operations of ACTS 12 and 13 illustrated in FIG. 5. That is, the processor 21 stops/deactivates a background application with lower usage frequency based on execution history regardless of a specific user and activates background applications with higher usage frequency in the number equal to or less than the activation limit number of the background applications.

Otherwise, after the transition to a logout state, the processor 21 executes operations of ACTS 22 and 23 illustrated in FIG. 6. That is, the processor 21 stops/deactivates a background application with lower usage frequency based on execution history regardless of a specific user, and entrance/exit management information or attendance management information, and activates background applications with higher usage frequency in the number equal to or less than the activation limit number of background applications.

Figure 8:
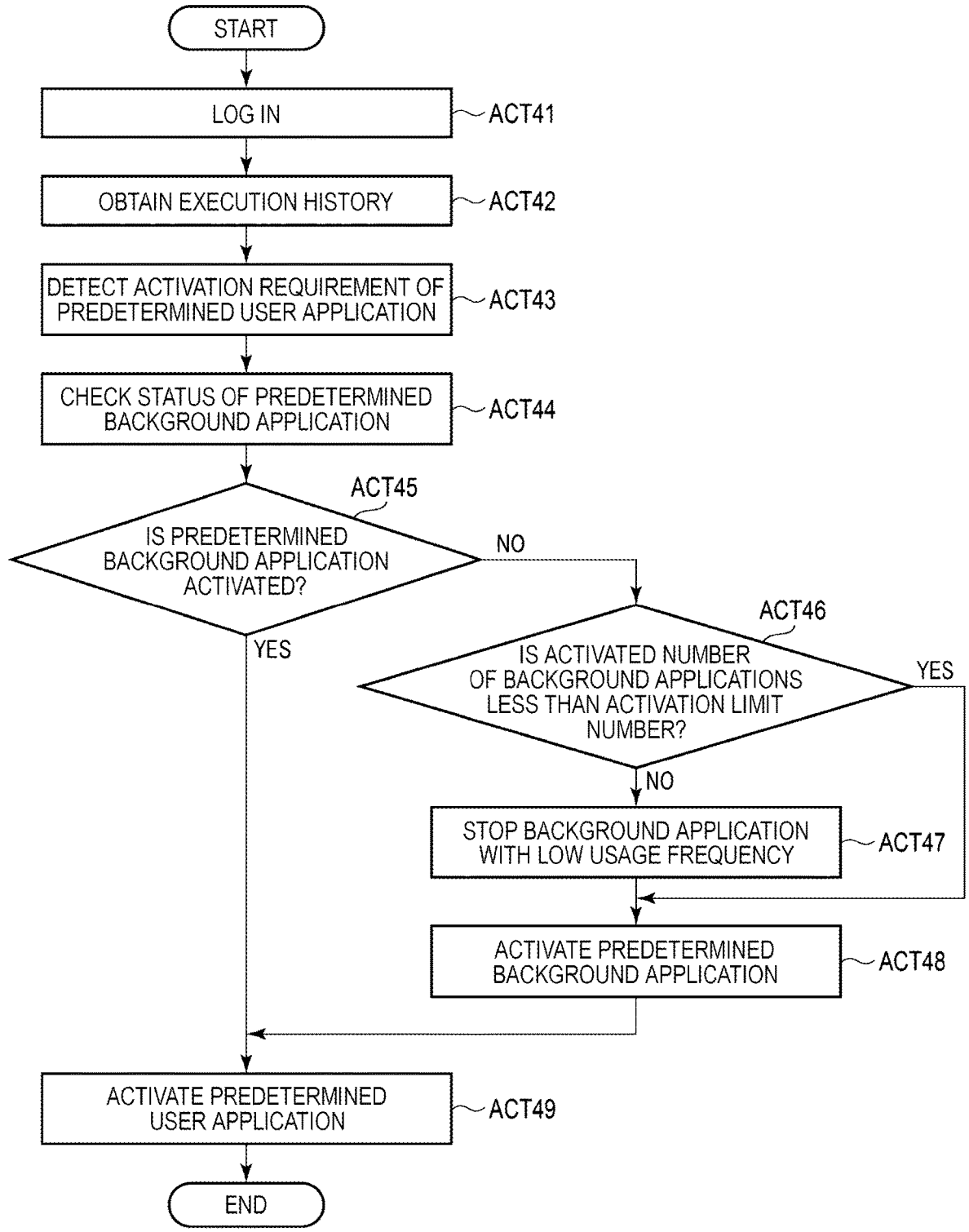
FIG. 8 is a flowchart illustrating a fourth example of the background application operation control.

FIG. 8 is a flowchart illustrating a fourth example of the background application operation control according to the embodiment. Here, a case where the image processing apparatus 1 executes a predetermined function in a login state is described.

The activated processor 21 of the image processing apparatus 1 receives login of a predetermined user (for example, the user A) based on a match of the read predetermined user identification information by the external interface 35 and the predetermined user identification information registered into the user management information, and transitions to the login state of the user A (ACT 41).

The processor 21 obtains the background application management information (execution history) from the data memory 24 or the external server (ACT 42).

If an activation request of a predetermined user application for executing a predetermined function is detected (ACT 43, YES), the processor 21 checks a state of a predetermined background application corresponding to the predetermined user application (ACT 44). If the predetermined background application is activated (ACT 45, YES), that is, the predetermined background application is stationed, the processor 21 activates the predetermined user application (ACT 49).

If the predetermined background application is not activated (ACT 45, NO), it is assumed that the number of activated background application is less than the activation limit number (ACT 46, YES). Here, the processor 21 activates the predetermined background application (ACT 48) and activates the predetermined user application (ACT 49).

If the predetermined background application is not activated (ACT 45, NO), it is assumed that the number of activated background application is the activation limit number (ACT 46, NO). Here, the processor 21 stops/deactivates the background application with the lowest usage frequency among the activated background applications based on the execution history in correlation with the user identification information of the user A (ACT 47). The processor 21 activates the predetermined background application (ACT 48) and activates the predetermined user application (ACT 49).

If the predetermined user application is activated, for example, the operation panel 34 displays the read menu screen of the image and receives user input of an image read condition, an image read start, and the like via the menu screen. The scanner 11 reads the document image and outputs the read image data. If the predetermined background application is activated, the processor 21 transmits the read image data output from the scanner 11 to the designated storage destination.

As a result, the image processing apparatus 1 realizes smooth image processing with little stress by stationing background applications with higher usage frequency for a login user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image processing apparatus comprising:
   a memory configured to store a plurality of user applications and a plurality of background applications related to image processing;
   a user interface configured to receive a user input;
   a processor configured to:
      control an image processing unit to execute image processing functions;
      control activation and deactivation of the plurality of user applications and the plurality of background applications;
      activate a first subset of the plurality of background applications in a first number equal to or less than an activation limit number and based on (a) attendance information identifying a plurality of potential users of the image processing apparatus present in a location associated with the image processing apparatus and (b) an overall execution history of the plurality of background applications for the plurality of potential users;
receive user identification information for a current user of the image processing apparatus;
activate a second subset of the plurality of background applications in a second number equal to or less than the activation limit number and based on a user specific execution history of the plurality of background applications associated with the user identification information, wherein activating the second subset includes at least one of (a) deactivating one or more of the plurality of background applications included in the first subset but not included in the second subset or (b) activating one or more of the plurality of background applications included in the second subset but not included in the first subset; and
reactivate the first subset of the plurality of background applications based on the attendance information and the overall execution history.

2. The image processing apparatus according to claim 1, wherein the processor is configured to stop a first background application of the second subset with the lowest usage frequency of currently active background applications and activate a second background application requested by the current user.

3. The image processing apparatus according to claim 2, wherein the processor is configured to stop the first background application and then activate the second background application when a number of the currently active background applications exceeds the activation limit number due to activation of the second background application.

4. The image processing apparatus according to claim 1, wherein
each of the plurality of user applications is an application related to a user interface for receiving the user input, and
each of the plurality of background applications is an application related to background processing independent from the user input.

5. The image processing apparatus according to claim 4, wherein
the processor is configured to activate a predetermined user application and a predetermined background application in cooperation with each other,
the user interface is configured to receive predetermined image processing based on the predetermined user application,
the processor is configured to control the image processing unit to execute the predetermined image processing, and
the processor is configured to execute background processing related to the predetermined image processing based on the predetermined background application.

6. The image processing apparatus according to claim 1, wherein the attendance information indicates which of the plurality of potential users are present or not present within a building, office, or room within which the image processing apparatus is located.

7. The image processing apparatus according to claim 1, further comprising the image processing unit, wherein the image processing unit includes at least one of a printer or a scanner.

8. The image processing apparatus according to claim 1, wherein the processing circuit is configured to reactivate the first subset based on the overall execution history and the attendance information in response to no user inputs being received at the image forming device for a predetermined period of time.

9. An application operation control method comprising:
obtaining, by a processor, execution history of a plurality of background applications among a plurality of user applications, the plurality of background applications related to image processing; and
activating a first subset of the plurality of background applications in a first number equal to or less than an activation limit number based on (a) attendance information identifying a plurality of potential users of an image processing apparatus present in a location associated with the image processing apparatus and (b) an overall execution history of the plurality of background applications for the plurality of potential users;
receiving user identification information for a current user of the image processing apparatus;
activating a second subset of the plurality of background applications in a second number equal to or less than the activation limit number and based on a user specific execution history of the plurality of background applications associated with the user identification information, wherein activating the second subset includes at least one of (a) deactivating one or more of the plurality of background applications included in the first subset but not included in the second subset or (b) activating one or more of the plurality of background applications included in the second subset but not included in the first subset; and
reactivating the first subset of the plurality of background applications based on the attendance information and the overall execution history.

10. The application operation control method according claim 9, further comprising stopping a first background application of the second subset with the lowest usage frequency of currently active background applications and activating a second background application requested by the current user.

11. The application operation control method according claim 10, further comprising stopping the first background application and then activating the second background application when a number of the currently active background applications exceeds the activation limit number due to activation of the second background application.

12. The application operation control method according to claim 9, wherein
each of the plurality of user applications is an application related to a user interface for receiving the user input, and
each of the plurality of background applications is an application related to background processing independent from the user input.

13. The application operation control method according to claim 9, wherein attendance information indicates which of the plurality of potential users are present or not present within a building, office, or room within which an image processing apparatus including the processor is located.

14. The application operation control method according to claim 9, wherein reactivating the first subset based on the overall execution history and the attendance information is in response to no user inputs being received at the image processing device for a predetermined period of time.

* * * * *